R. SHIPMAN.

CARBURETER FOR EXPLOSIVE ENGINES.

APPLICATION FILED MAR. 15, 1915.

Reissued Apr. 20, 1915. 13,903.

Witnesses

C. W. Dasher.

C. Van Sant

Inventor

Ralph Shipman

By Wilson & Boyden

Attorneys

UNITED STATES PATENT OFFICE.

RALPH SHIPMAN, OF SUNBURY, PENNSYLVANIA.

CARBURETER FOR EXPLOSIVE-ENGINES.

13,903. Specification of Reissued Letters Patent. Reissued Apr. 20, 1915.

Original No. 783,902, dated February 28, 1905, Serial No. 188,211. Application for reissue filed March 15, 1915. Serial No. 14,613.

*To all whom it may concern:*

Be it known that I, RALPH SHIPMAN, a citizen of the United States, residing at Sunbury, in the county of Northumberland and State of Pennsylvania, have invented new and useful Improvements in Carbureters for Explosive-Engines, of which the following is a specification.

This invention relates to improvements in carbureters for explosive-engines; and its purpose is to cause the intimate mixture of liquid fuel with air and to secure a constant mixture to the engine.

The various features of the invention will be hereinafter more fully described in connection with the accompanying drawings, in which—

Figure 1:
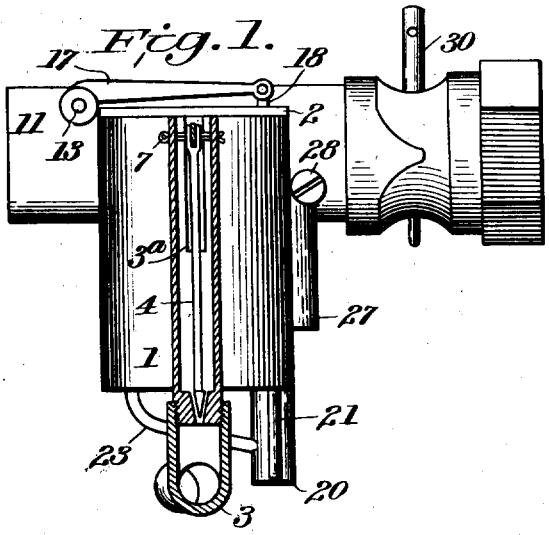
Figure 2:
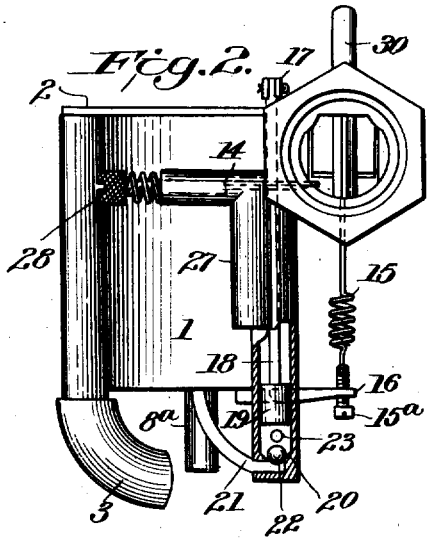
Figure 6:
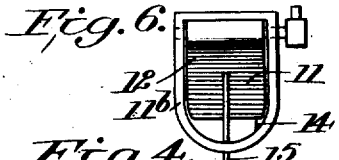
Figure 3:
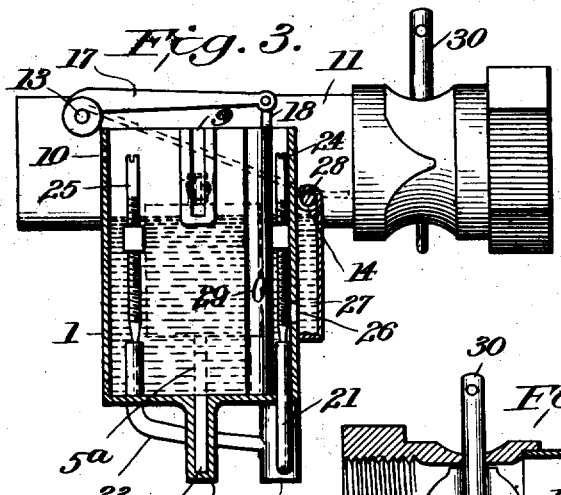
Figure 4:
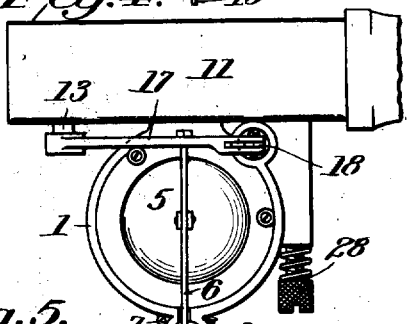
Figure 5:
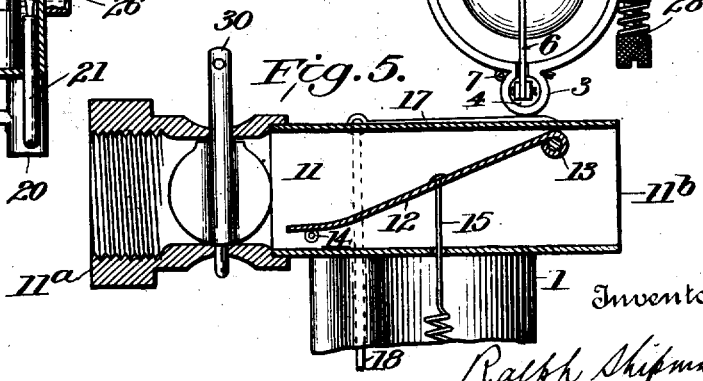

Figure 1 is a side view of the carbureter, the feed-pipe for the reservoir being shown in central section. Fig. 2 is an end view of the same looking from the right in Fig. 1, the cylinder of the valve-retarding device being shown partly in section. Fig. 3 is a side view, the reservoir being shown in central vertical section with its cover removed and the float which controls the admission of liquid fuel to the reservoir being shown in dotted lines. Fig. 4 is a top plan view of the carbureter with the cover of the reservoir removed. Fig. 5 is a view showing the mixing-chamber in longitudinal vertical section, and Fig. 6 is an end view of the mixing-chamber looking from the left in Figs. 1 and 3.

Referring to the drawings, 1 indicates a reservoir having a removable top 2. Any suitable liquid fuel is supplied to the reservoir by a feed-pipe 3, communicating through an opening $3^a$ with the reservoir, and the supply of liquid in the reservoir is maintained at a practically constant level by means of a valve 4, operated by a float 5 through the medium of a lever 6, which is pivotally connected to the float and to the needle-valve 4 and fulcrumed upon a fixed pivot-pin 7 between the float and the needle-valve. The float is centered within the reservoir by a rod $5^a$, extending downward from the center of the float into a socket 8, formed in a projection $8^a$, extending downward from the bottom of the reservoir, and by a vertical guide-groove 9 within the reservoir which engages and guides the free end of the lever 6. The upward movement of the float causes the needle-valve to close, and the downward movement of the float causes said valve to open, thus controlling the supply of liquid to the reservoir and maintaining the liquid at a practically constant level in the reservoir. The reservoir is in communication with the atmosphere through a small vent-opening 10, formed in the upper part of the reservoir-casing, which prevents the formation of a partial vacuum in the reservoir when the liquid is withdrawn therefrom.

Adjacent to the reservoir 1 is arranged a mixing-chamber 11, consisting of a tubular casing having a coupling $11^a$ at one end for attachment to a pipe leading to the engine and having its opposite end $11^b$ open, so as to admit air freely to the mixing-chamber. Within the casing of the mixing-chamber is arranged a valve 12, which is secured to a shaft or pin 13, arranged transversely in the upper portion of the casing near its open end. This valve extends longitudinally in the casing, and its free end normally rests upon a stop 14 near the bottom of the chamber adjacent to the coupling $11^a$, which stop prevents the complete closure of the valve. The stop 14 in this instance is the end of the tube through which vapor is drawn into the mixing-chamber in the manner hereinafter described. The valve is normally held against the stop by a spring 15, one end of which passes through the lower wall of the mixing-chamber and is connected to the valve, while its opposite end is connected to an adjusting-screw $15^a$, mounted in a bracket 16, which is attached to the reservoir. The valve restricts the flow of air through the mixing-chamber and directs the air past the opening in the pipe 14, through which the liquid spray is drawn into the mixing-chamber. The valve opens to a greater or less extent, according to the suction of the engine, and the quantity of air is accordingly varied. Any suitable form or arrangement of spring may be substituted for that shown in the drawings.

It is desirable to permit the valve 12 to open rather freely and to retard its closing movement in order to avoid the hammering of the valve against its stop. For this purpose a lever 17 is secured to the rod 13, upon which the valve is mounted, and to the free end of this lever is pivotally connected a rod 18, having thereon a plunger 19, Fig. 2, which operates in a pump cylinder or barrel 20. A pipe or passageway 21 leads from the interior of the reservoir to the bottom of the cylinder, and a check-valve 22 is arranged within the cylinder to prevent the return of fluid through said pipe 21. Another pipe or passage-way, 23, extends from the interior of the reservoir to the interior of the pump-barrel at a point above the entrance of the pipe 21. Needle-valves 24 and 25 are arranged within the mouths of the pipes 21 and 23, respectively, in the reservoir, so that the flow of liquid through the pipes may be regulated and the retarding action on the throat-valve 12 may be controlled. It will be evident that when the plunger 19 is moved upward by the throat-valve 12 liquid will be drawn into the pump-barrel through pipe 21, and when the plunger descends this liquid will be forced out through the pipe 23. By adjusting the needle-valve 25 the return of liquid to the reservoir may be regulated so as to retard the downward movement of the plunger.

The gasolene or other carbureting liquid is conducted from the reservoir to the mixing-chamber through the opening 26, passage-way 27, and through pipe or passage-way 14, leading from the passage-way 27 at a point a little above the level of the liquid into the mixing-chamber below the valve 12. The flow of liquid into the chamber is controlled by the needle-valve 28 in the passage-way 14.

In order to obviate the necessity of making the plunger fit air-tight within the cylinder and to insure efficient lubrication and uniform working of the plunger, liquid is supplied from the reservoir to the pump or dashpot cylinder through an opening 29 above the plunger.

The operation of the device is as follows: The liquid is supplied to the reservoir and maintained at a constant level therein by the action of the float and valve 4. The needle-valve 28 is opened to permit a limited flow of the liquid to the mixing-chamber 11. At each suction-stroke of the engine air is drawn through chamber 11 under valve 12 and draws the liquid by suction from inlet 14, and an intimate mixture is produced. The throat-valve 12, which is acted upon by the spring 15, restricts the flow of air, and the valve is opened only when there is a demand for air made by the engine. When the valve is moved upward by inrushing air, it raises the plunger in the cylinder, which causes liquid to flow into the lower part of the cylinder through passage-way 21. Upon the return of the valve and plunger the check-valve prevents the liquid from flowing through passage 21, and it escapes from the cylinder through passage 23 to the reservoir, and on account of the slow return of the liquid the downward movement of the plunger is retarded, thus preventing any sudden closure of the valve 12 when there is no demand for air. The supply of the mixture to the engine is regulated by controlling-cock 31, which is usually connected to a suitable lever convenient to the operator.

Having described my invention, what I claim, and desire to secure by Letters Patent, is—

1. In an atomizer for an internal-combustion engine, a normally open-air passage, a fuel-supply nozzle projecting into said passage, a swinging damper normally operating to partially close that portion of the air-passage at said nozzle but leaving said nozzle open at all times said damper being adapted to move and increase the size of said passage proportional to an increased volume of air traversing said passage.

2. In an atomizer for internal-combustion engines, an air-passage, a fuel-supply nozzle projecting into said passage, a swinging damper, the free end of the same moving toward and away from said nozzle and normally operating to partially close the air-passage at said nozzle but leaving the latter open at all times, said damper being movable to increase the size of the passage directly adjacent to the nozzle proportionally to an increased volume of air traversing said passage.

3. In a carbureter for explosive-engines, a mixing-chamber comprising a tubular casing having one end adapted for connection to an engine and an air-admission opening at its opposite end, a hinged valve within the casing, normally restricting the passage of air through the casing and adapted to open by atmospheric pressure, and means for admitting liquid fuel into said casing at a point adjacent to the free end of said valve and between said free end and the air-admission opening.

4. In a carbureter for explosive engines, the combination with a mixing-chamber, having an air-inlet opening, a reservoir for liquid fuel adjacent to said chamber and a passage-way connecting said reservoir and chamber, of a valve normally restricting the flow of air to said chamber and adapted to open by atmospheric pressure, and means for retarding the return or closing movement of said valve comprising a reciprocating pump having its plunger connected to said valve, the cylinder of said pump having inlet and outlet openings communicating with said reservoir, and means for regulating the flow of liquid through said openings.

5. In a carbureter for explosive-engines, the combination with a mixing-chamber having an air-inlet opening, a reservoir for liquid fuel adjacent to said chamber and a passage-way connecting said reservoir and chamber, of a valve normally restricting the flow of air to said chamber and adapted to open by atmospheric pressure, and means for retarding the return or closing movement of said valve comprising a reciprocating pump, having its plunger connected to said valve, said pump being arranged to pump liquid into and out of said reservoir.

6. In a carbureter for explosive-engines, the combination with a mixing-chamber having an air-inlet opening, a reservoir for liquid fuel adjacent to said chamber and a passageway connecting said reservoir and chamber, of a valve normally restricting the flow of air to said chamber and adapted to open by atmospheric pressure, and means for retarding the return or closing movement of said valve comprising a reciprocating pump having its plunger connected to said valve, the cylinder of said pump having inlet and outlet openings communicating with said reservoir.

7. In a carbureter for explosive-engines, a mixing-chamber comprising a tubular casing having one end adapted for connection to an engine and an opening at its opposite end for the admission of air, a valve pivoted at one end within the casing and extending longitudinally therein and adapted to open by atmospheric pressure, and means for admitting liquid fuel into said casing between the free end of said valve and the adjacent wall of the casing.

8. In a carbureter for explosive-engines, a mixing-chamber comprising a tubular casing having one end adapted for connection to an engine and an opening at its opposite end for the admission of air, a valve pivoted at one end within the casing and extending longitudinally therein and adapted to open by atmospheric pressure, a stop arranged to prevent the complete closure of said valve, and means for admitting liquid fuel into said casing between the free end of said valve and the adjacent wall of the casing.

9. In a carbureter for explosive-engines, a mixing-chamber comprising a tubular casing having one end adapted for connection to an engine and an opening at its opposite end for the admission of air, a valve pivoted at one end within the casing and extending longitudinally therein and adapted to open by atmospheric pressure, means for admitting liquid fuel into said casing between the free end of said valve and the adjacent wall of the casing, and means for retarding the closing movement of said valve.

10. In a carbureter for explosive-engines, a mixing-chamber comprising a tubular casing having one end adapted for connection to an engine and an opening at its opposite end for the admission of air, a valve pivoted at one end within the casing and extending longitudinally therein and adapted to open by atmospheric pressure, a stop arranged to prevent the complete closure of said valve, means for admitting liquid fuel into said casing between the free end of said valve and the adjacent wall of the casing, and means for retarding the closing movement of said valve.

11. In a carbureter for explosive-engines, the combination with a mixing-chamber having an air-inlet opening, a reservoir for liquid fuel adjacent to said chamber and a passageway connecting said reservoir and chamber, of a valve normally restricting the flow of air to said chamber and adapted to open by atmospheric pressure, and means for retarding the return or closing movement of said valve comprising a reciprocating pump having its plunger operatively connected to said valve, the cylinder of said pump having inlet and outlet openings communicating with said reservoir, a check-valve controlling said inlet-opening to the pump-cylinder and a valve arranged to regulate the passage of fluid through said outlet-opening of the pump cylinder.

12. In a carbureter for explosive-engines, the combination with a reservoir for liquid fuel and means for maintaining the liquid therein at a practically constant level, of a horizontally-arranged mixing-chamber adjacent to said reservoir, a vertically-adjustable valve arranged longitudinally in said chamber, means for admitting liquid fuel into said chamber between the free end of said valve and the adjacent wall of the chamber.

13. In a carbureter for explosive-engines, the combination of a mixing-chamber, a spring-pressed valve arranged to restrict the flow of air through said chamber and to open by atmospheric pressure, a reservoir for liquid fuel adjacent to said mixing-chamber, and means for retarding the closing movement of said valve comprising a reciprocating pump having its plunger operatively connected to said valve, the barrel of said pump having an opening above the plunger communicating with said reservoir and having inlet and outlet openings below the plunger communicating with said reservoir.

14. In an atomizer for an internal-combustion engine, a normally open air-passage, a fuel-supply nozzle projecting into said passage, a swinging damper normally operating to partially close that portion of the air-passage at said nozzle but leaving said nozzle open at all times said damper being adapted to move and increase the size of said passage proportioned to an increased volume of air traversing said passage, and means for retarding the return movement of the damper.

15. In a carbureter for explosive engines, the combination with a reservoir for liquid fuel and means for maintaining the fuel therein at a practically constant level, of a mixing chamber adjacent said reservoir and having air and fuel inlet openings, the latter opening communicating with the reservoir so that the air draft past the fuel opening will cause fuel to be sucked from the reservoir into said chamber, a valve normally restricting the flow of air through said chamber and adapted to open by atmospheric pressure, and means for retarding the closing movements of said valve comprising a cylinder communicating with said reservoir so as to receive liquid fuel therefrom and a piston connected to said valve and operating in said cylinder.

In testimony whereof I have affixed my signature.

RALPH SHIPMAN.

Copies of this patent may be obtained for five cents each, by addressing the "Commissioner of Patents, Washington, D. C."